Figure 1:
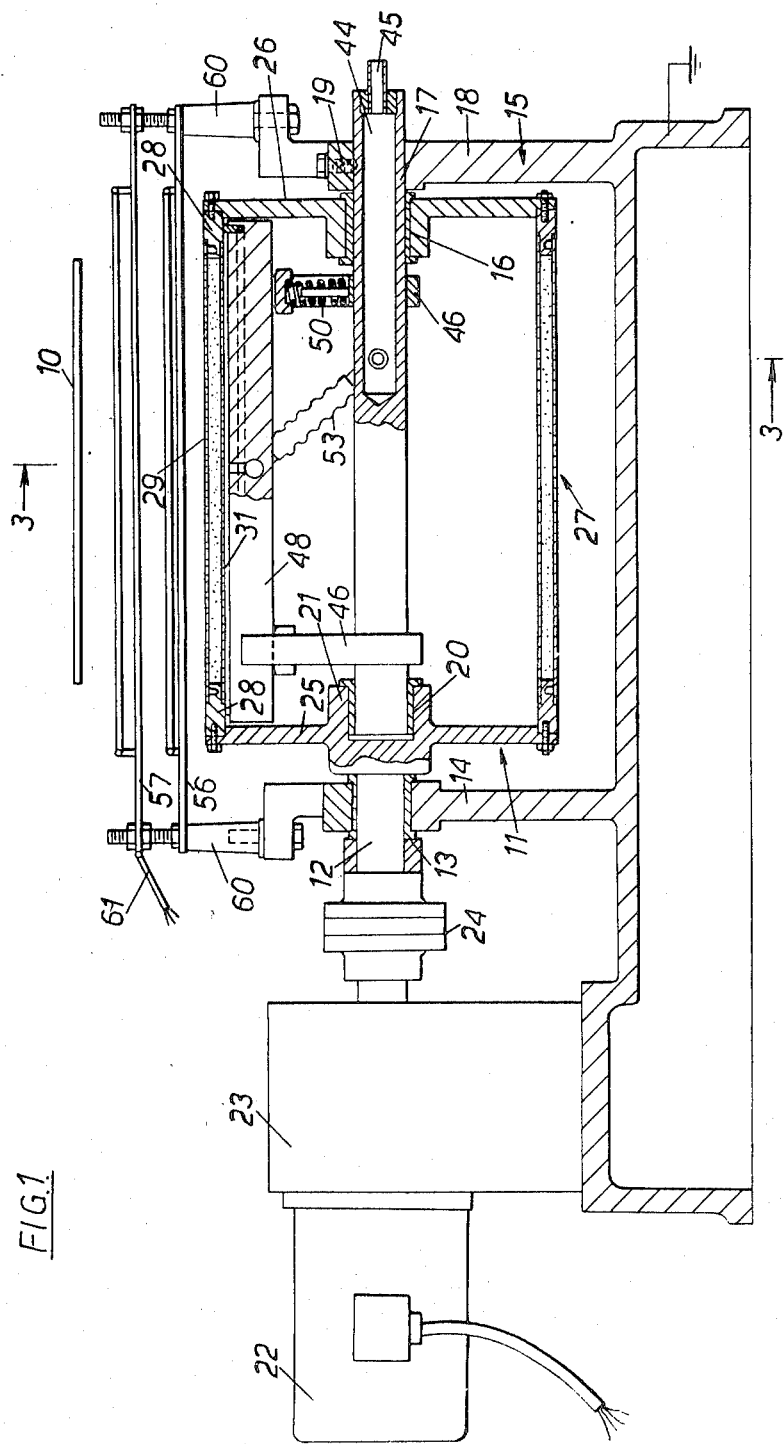

United States Patent

[11] 3,628,501

[72] Inventors Albert Edward Jackson
　　　　　　Gwernaffield;
　　　　　　Robert Gordon Russell, Penyffordd, near
　　　　　　Chester, both of England
[21] Appl. No. 782,897
[22] Filed　　Dec. 11, 1968
[45] Patented Dec. 21, 1971
[73] Assignee John Summers & Sons Limited
　　　　　　Shotton Deeside, England
[32] Priorities Dec. 15, 1967
[33]　　　　　Great Britain
[31]　　　　　57,096/67;
　　　　　　Dec. 15, 1967, Great Britain, No.
　　　　　　57,098/67

[54] APPARATUS FOR COATING A SURFACE OF A
　　　SUBSTRATE WITH POWDERED MATERIAL
　　　8 Claims, 3 Drawing Figs.

[52] U.S. Cl. .................................................... 118/630,
　　　　　　　　　　　　　　　　　　　　　118/308
[51] Int. Cl. ...................................................... B05b 5/08
[50] Field of Search............................................. 118/629,
　　　　　627, 625, 408, 630, 631, 638, 640, 308

[56]　　　　　　　　References Cited
　　　　　　　　　UNITED STATES PATENTS
2,174,328　9/1939　Meston et al. ................　118/629
3,060,429　10/1962　Winston .......................　118/627 X
3,513,810　5/1970　Jackson .........................　118/629

Primary Examiner—John P. McIntosh
Attorney—Mawhinney & Mawhinney

ABSTRACT: Apparatus for coating a surface of an earthed substrate with powdered material comprising an earthed dispensing rotor to direct powdered material towards the substrate successively through two electrically conducting screens, which are disposed between the dispensing means and the substrate, the screens nearer to the substrate being electrostatically charged, the screen nearer to the dispensing means being electrically isolated and having in operation an electrical charge induced therein. The rotor has a fluid-permeable curved wall structure filled with porous material the outer periphery of the wall having packets sequentially supplied with powder, fluid being supplied to a portion of the inner periphery which at any moment is angularly spaced from the pockets being supplied with powder.

APPARATUS FOR COATING A SURFACE OF A SUBSTRATE WITH POWDERED MATERIAL

This invention concerns apparatus for coating a surface of a substrate with powdered material, and although the invention is not so restricted, it is more particularly concerned with apparatus for coating a surface of a moving steel strip with metered quantities of metal powders e.g., aluminum, nickel or chromium powders) for subsequent compaction and sintering thereon.

According to one aspect of the present invention, there is provided apparatus for coating a surface of a substrate with powdered material comprising support means for supporting a substrate, dispensing means for dispensing powdered material, means for causing the powdered material from the dispensing means to travel towards the substrate, two electrically conducting screens which are disposed between the dispensing means and the substrate, the screens being spaced from each other and from both the dispensing means and the substrate so that the powdered material which travels from the dispensing means towards the substrate passes successively through said screens, means for earthing the dispensing means and the substrate, and means for electrostatically charging the screen nearer to the substrate, the screen nearer to the dispensing means being electrically isolated and being adapted in operation to have an electrical charge induced therein.

In the apparatus of the present invention, the electrostatic forces which are created assist in the deposition of the powdered material on the substrate and thus allow this deposition to be effected with less consequential deposition of dust on the substrate.

Preferably, the screen nearer to the substrate is disposed substantially midway between the latter and the dispensing means.

Preferably also, the screen nearer to the dispensing means is substantially nearer to the latter than to the other screen.

The means for charging the screen nearer to the substrate may charge the said screen at a positive or negative potential of at least 20 Kv.

There may be means for employing fluid pressure to force the powdered material from the dispensing means towards the substrate.

The dispensing means may comprise a rotor provided with peripheral pockets, powder supply means being provided for supplying the said pockets with powdered material.

The rotor may have a fluid-permeable curved wall structure whose outer periphery is provided with the said pockets, a fluid conduit being disposed within and sealed to the inner periphery of the curved wall structure, the portion of the curved wall structure which, at any moment, receives powdered material from the powder supply means being angularly spaced from the portion of the curved wall structure which receives fluid from the fluid conduit.

Thus, according to another aspect of the present invention, there is provided apparatus for delivering metered quantities of powdered material towards a point of use, the said apparatus comprising a rotor having an outer perforated shell whose perforations are adapted to receive the powdered material, the rotor also having an inner perforated shell which is mounted within the outer perforated shell and is spaced therefrom by means comprising a porous filling, the said means closely contacting the outer perforated shell, powder supply means which, as the rotor rotates, are arranged to supply the powdered material to the perforation in successive portions of the outer perforated shell, and a fluid conduit which is disposed within the inner perforated shell and which is, at any moment, sealed to a portion thereof which is angularly spaced from the portion of the outer perforated shell which is being supplied with powdered material from the powder supply means, the fluid conduit being adapted to be supplied with a fluid which will pass through the inner perforated shell and the porous filling to eject the powdered material from the perforations in the outer perforated shell and so deliver metered quantities of the powdered material towards the point of use.

As will be appreciated, the outer perforated shell closely contacts the portion of the rotor which is disposed immediately radially inwardly of it, this being desirable to prevent the powdered material from passing therebetween. Moreover, if, as is preferably the case, the fluid conduit is nonrotatable, the inner perforated shell being in bearing contact therewith, then the perforations of the inner perforated shell may easily be made of such size that any "smearing" of the inner perforated shell by the fluid conduit will not be such as to occlude these perforations.

The porous filling preferably fills an annular space between two perforated or porous flexible sleeves which are respectively disposed in contact with the inner surface of the outer perforated shell and the outer surface of the inner perforated shell.

Sand is preferably employed to constitute the porous filling.

Alternatively, felt may be employed to constitute the porous filling.

The flexible sleeves may be formed of synthetic resin material, while each of the said shells may be a metallic shell.

A movable portion of the fluid conduit may be urged into bearing contact with the inner perforated shell, the said movable portion of the fluid conduit being connected to a fixed portion thereof by a flexible portion.

The invention also comprises apparatus as set forth above when used to deposit a coating of the powdered material onto a moving strip.

Figure 2:
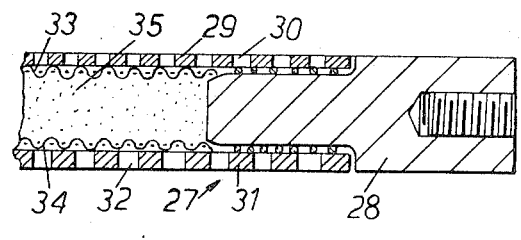
Figure 3:
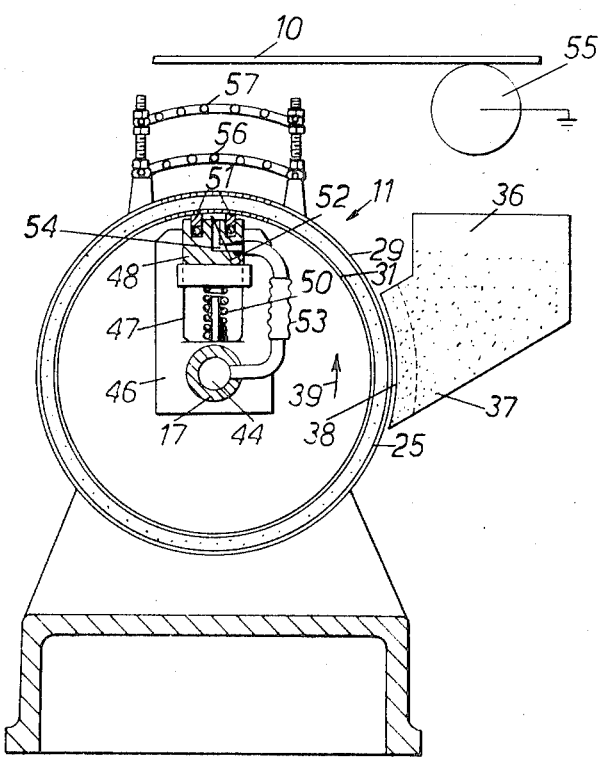

The invention is illustrated, merely by way of example, in the accompanying drawings, in which:

FIG. 1 is a diagrammatic sectional view of an apparatus according to the present invention, FIG. 2 is a broken-away sectional view, on a larger scale, of part of the structure shown in FIG. 1, and FIG. 3 is a section taken on the line 3—3 of FIG. 1.

Referring to the drawings, an apparatus for delivering a powdered metal or alloy onto a moving steel strip 10 comprises a rotor 11 one end of which is drivingly mounted on a drive shaft 12, the drive shaft 12 being rotatably mounted in a bush 13 carried by an upright frame member 14 of an earthed support frame 15.

The end of the rotor 11 remote from the drive shaft 12 is rotatably mounted on a bush 16, the bush 16 being mounted on a stationary rod 17. One end of the rod 17 is mounted in an upright frame member 18 of the frame 15 and is secured thereto by studs 19, the opposite end of the rod 17 being mounted in a bush 20 which is received within a recess of a boss 21 at the end of the rotor 11 adjacent the drive shaft 12.

The drive shaft 12 is driven by an electric motor 22 through a gear box 23 and clutch 24.

The rotor 11 has circular end walls 25, 26 between which is bolted a fluid-permeable curved wall structure 27. The curved wall structure 27, as best seen in FIG. 2, comprises annular end wall members 28 which support an outer perforated metallic shell 29 having perforations 30 and an inner perforated metallic shell 31 having perforations 32.

The outer perforated shell 29 and the inner perforated shell 31 are radially spaced apart to provide an annular space therebetween in which are disposed radially spaced apart porous flexible nylon sleeves 33, 34. The sleeves 33, 34 may have a porosity of approximately 5 microns if the apparatus is to be used for delivery powders having a particle size of about 5 microns. However, if powders of larger particle size are being dealt with, the sleeves 33, 34 may be perforated rather than porous.

The sleeves 33, 34 are respectively disposed in contact with the inner surface of the outer perforated shell 29 and the outer surface of the inner perforated shell 31. The annular space between the sleeves 33, 34 is filled by pouring a sand filling 35 thereinto, the sand filling 35, which constitutes a porous filling, being compacted by vibration and physical pressure so as to stretch the sleeve 33 into intimate contact with the outer perforated shell 29, and the sleeve 34 into intimate contact with the inner perforated shell 31. Prior to such compaction of the sand filling 35, however, the diameters of the sleeves 33, 34 may differ by, say, one-fourth inch from those of the respective shells, 29, 31.

Alternatively, a porous felt filling can be provided instead of the sand filling. A strip of felt is cut so as to lie as a helix around the outer surface of the sleeve 34. The felt strip is wrapped tightly around the inner sleeve 34 with its ends anchored and the outer sleeve 33 is stretched thereover. The ends of the felt strip are then released, and the strip expands radially to force the sleeves 33, 34 into intimate contact with the outer and inner shells 29, 31 respectively.

A hopper 36, or other powder supply means, which may contain a powdered metal or alloy 37, e.g., powdered aluminum, nickel, or ferrochrome, has an outlet 38 which bears directly against, or is closely spaced from, the outer perforated shell 29. Thus, as the rotor 11 rotates counterclockwise, as indicated by the arrow 39, the powdered metal or alloy 37 will be supplied to the perforations 30 in successive portions of the outer perforated shell 29. The perforations 30 will thus act as pockets in the outer periphery of the rotor 11, the pockets being adapted to receive the powdered metal or alloy from the hopper 36.

The rod 17 has an axially extending passage 44 therein whose outer end communicates with a fixed air (or other gas) conduit 45, which is adapted to be supplied with compressed air (by means not shown). Mounted on the rod 17 are axially spaced apart frame members 46 each of which is provided with a radially extending slot 47, an elongated block 48 being slidably mounted in the slots 47.

The block 48, which is mounted immediately radially inwardly of the inner perforated shell 31, is urged radially outwardly towards the latter by springs 50.

The block 48 is provided at its radially outer side with radially movable sealing members 51 which are urged by the springs 50 to bear against the internal surface of the inner perforated shell 31. The sealing members 51 define with the block 48 and the internal surface of the inner perforated shell 31 a space 52 which is supplied with air from the fixed air conduit 45 by way of the passage 44, a flexible conduit 53, and a passage 54 through the block 48.

Thus the stationary air conduit constituted by the parts 45, 44, 53, 54, 52 is, at any moment, sealed to the portion of the inner perforated shell 31 which is angularly spaced from the portion of the outer perforated shell 29 which is, at that moment, being supplied with powdered metal or alloy 37 from the hopper 36.

As will be appreciated, the air flowing radially outwardly through the said air conduit will pass through the perforations 32 in the inner perforated shell 31, and thence through the sleeve 34, the sand filling 35, and the sleeve 33, so as to pass out through the perforations 30 in the outer perforated shell 29. As a result, the powdered metal or alloy 37 in the perforations 30 which are radially aligned at any moment with the space 52 will be dispensed therefrom and ejected radially outwardly towards the substrate constituted by the moving steel strip 10, and will thus coat the adjacent surface thereof.

The moving steel strip 10 is earthed by reason of being supported by earthed support rolls 55 (only one shown), while the rotor 11 is earthed by reason of its being supported by, and not insulated from, the earthed frame 15.

Between the moving steel strip 10 and the rotor 11 are two electrically conducting screens 56, 57 both of which are mounted on insulating supports 60 carried by the frame 15. The screens 56, 57 are spaced from each other and are also spaced from both the rotor 11 and the moving steel strip 10, so that the powdered metal or alloy which passes from the rotor 11 to the moving steel strip 10 passes successively through the screens 56, 57.

The screen 57, which is thus nearer to the moving steel strip 10, may be disposed substantially midway between the latter and the rotor 11, e.g. 2½ inches from each. The screen 56, which is nearer to the rotor 11, may be substantially nearer to the latter than to the other screen 57; for example, the screen 56 may be one-half inch from the rotor 11 and 2 inches from the screen 57.

The screen 57 is connected, as indicated diagrammatically by the cable 61, to means (not shown) which electrostatically charge it with a positive or negative potential, e.g. of at least 20 kv. The screen 56, however, is electrically isolated but, in operation, has a potential induced in it. Thus, if the screen 57 is charged at −30 kv, the induced charge on the screen 56 may be −10 kv.

As a result of this arrangement, the electrostatic forces assist the air in depositing the powdered metal or alloy onto the moving steel strip 10, and thus diminish the amount of air pressure which it is necessary to use. In consequence, the amount of powdered metal or alloy lost to the atmosphere is reduced, while at the same time there will also be a reduction in the amount of airborne dust deposited on the moving steel strip 10.

It has been found advantageous to preheat the air supplied to the conduit 45 to about 40° C., particularly when powdered aluminum is used. It is though that agglomerates break up more easily in the electrostatic field when the powder is warm.

The powdered metal or alloy which is so deposited on the strip 10 is subsequently compacted and sintered, by means not shown.

Since the inner shell 31 is a perforated, as opposed to a porous shell, the perforations 32 therein may easily be made of such size that there need be no danger of any "smearing" caused by the bearing contact between the sealing members 51 and the inner perforated shell 31. If, on the other hand, such "smearing" were to occur, there would be occlusion of the passage of the air through the perforations 32. Moreover, the inner perforated shell 31 may be made of a metal which can be machined to form a suitable bearing surface.

Additionally, the use of flexible sleeves 33, 34, with the sand filling 35 therebetween, ensures that these sleeves may be brought into intimate contact with the shells 29, 31 so that powdered metal or alloy from the hopper 36 will not be able to pass between the sleeve 33 and the outer perforated shell 29.

We claim:

1. Apparatus for coating a surface of a substrate with powdered material comprising support means for supporting a substrate, dispensing means for dispensing powdered material, means to cause the powdered material from the dispensing means to travel towards the substrate, two electrically conducting screens which are disposed between the dispensing means and the substrate, the screens being spaced from each other and from both the dispensing means and the substrate, the powdered material which travels from the dispensing means towards the substrate passing successively through said screens, means for earthing the dispensing means and substrate, and means for electrostatically charging the screen nearer to the substrate, the screen nearer to the dispensing means being electrically isolated and being adapted in operation to have an electrical charge induced therein.

2. Apparatus as claimed in claim 1 wherein the screen nearer to the substrate is disposed substantially midway between the latter and the dispensing means.

3. Apparatus as claimed in claim 1 wherein the screen nearer to the dispensing means is substantially nearer to the latter than to the other screen.

4. Apparatus as claimed in claim 1 wherein the means for charging the screen nearer to the substrate charges the said screen at a positive or negative potential of at least 20 kv.

5. Apparatus as claimed in claim 1 in which the means to cause the powdered material to travel towards the substrate comprises means to employ fluid pressure to force the powdered material from the dispensing means towards the substrate.

6. Apparatus as claimed in claim 5 wherein the dispensing means comprises a rotor provided with peripheral pockets, powder supply means being provided for supplying the said pockets with powdered material.

7. Apparatus as claimed in claim 6 wherein the rotor has a fluid-permeable curved wall structure whose outer periphery is provided with the said pockets, a fluid conduit being disposed within and sealed to the inner periphery of the curved wall structure, the portion of the curved wall structure which, at any moment, receives powdered material from the powder supply means being angularly spaced from the portion of the curved wall structure which receives fluid from the fluid conduit.

8. Apparatus as claimed in claim 1 when used to deposit a coating of the powdered material onto a moving strip.

* * * * *